Oct. 3, 1967   J. P. GOODMAN   3,344,871
EARTH BORING MACHINES AND METHOD OF SETTING POLES
Filed Feb. 17, 1965   2 Sheets-Sheet 1
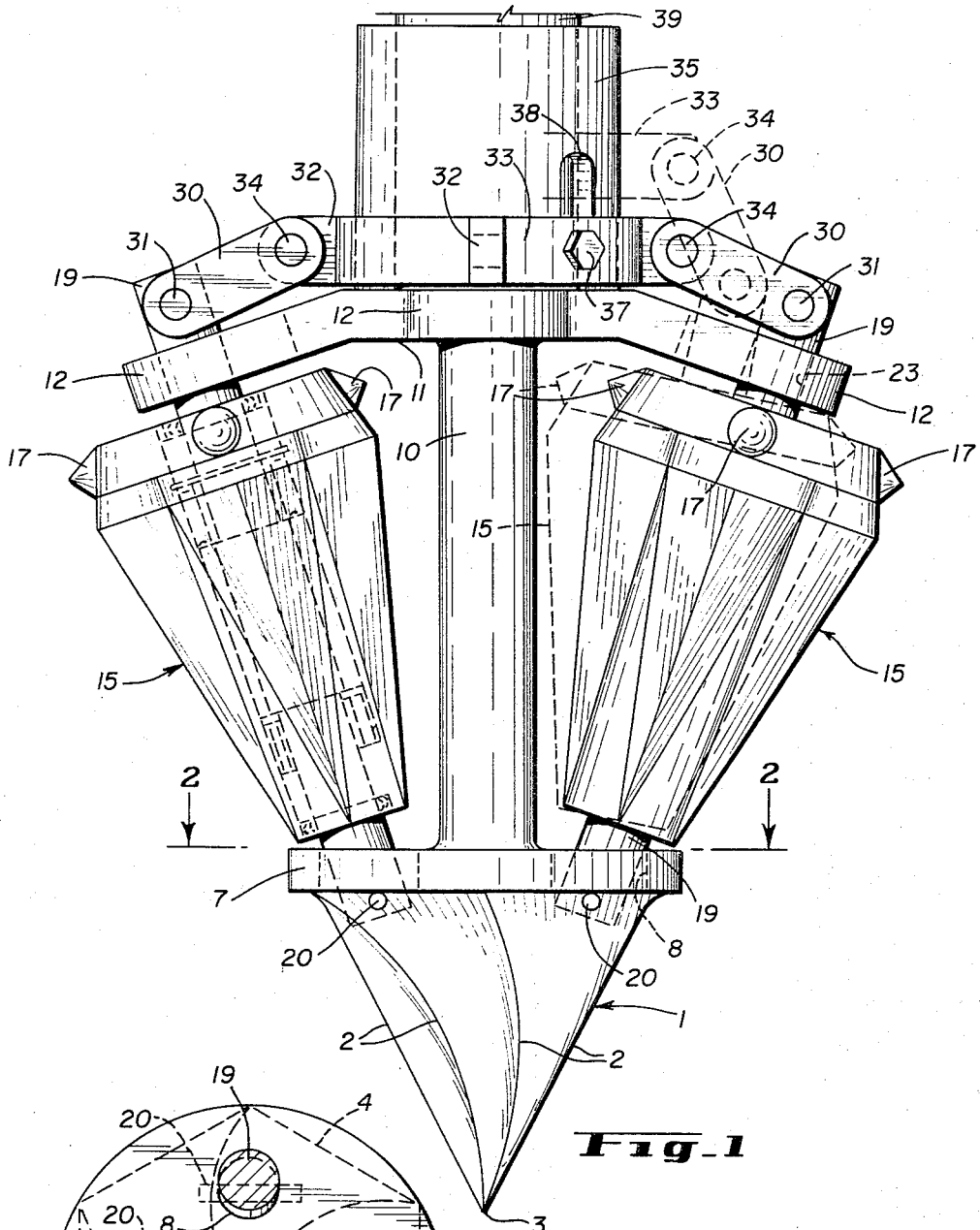
Fig_1
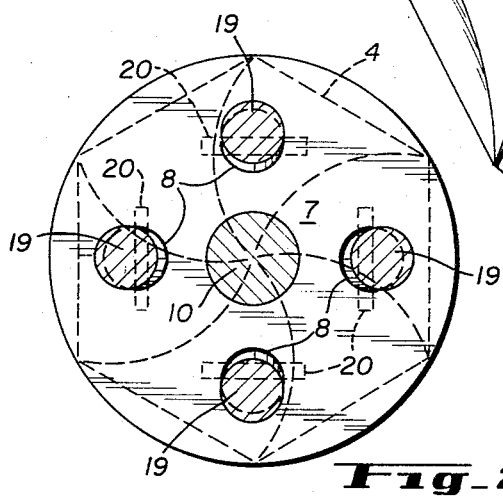
Fig_2
INVENTOR.
Jack P. Goodman
BY
ATTORNEYS

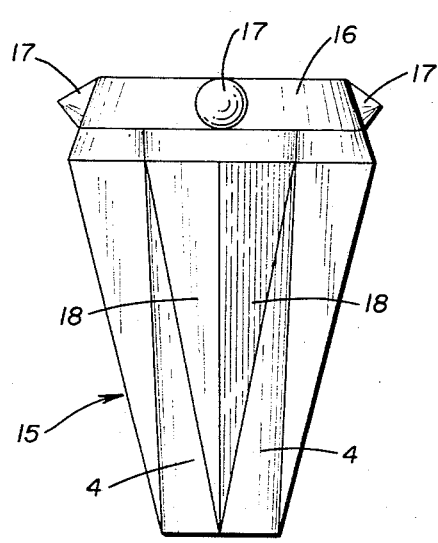
Fig_3
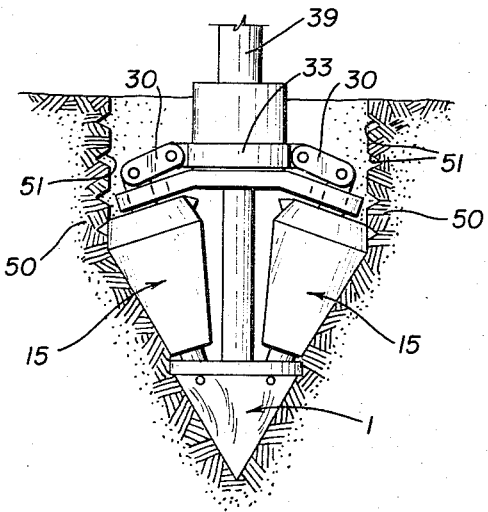
Fig_4
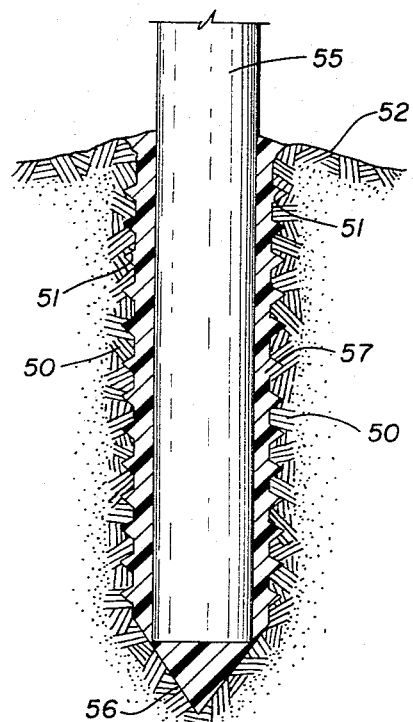
Fig_6
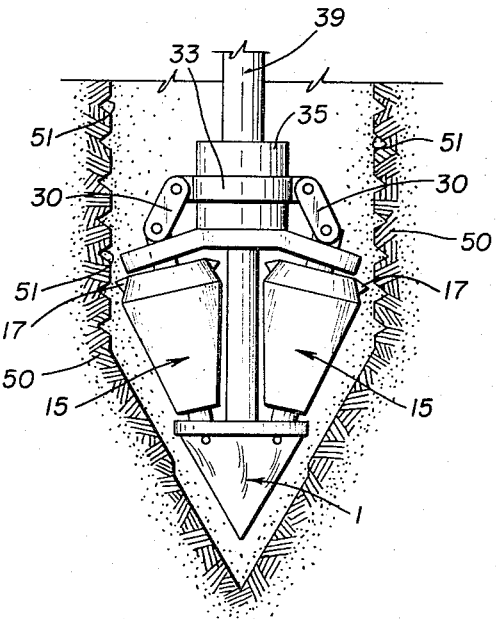
Fig_5
INVENTOR.
Jack P. Goodman
BY
McGrew & Edwards
ATTORNEYS

United States Patent Office 3,344,871
Patented Oct. 3, 1967

3,344,871
EARTH BORING MACHINES AND METHOD OF
SETTING POLES
Jack P. Goodman, 4000 Holland Drive,
Wheatridge, Colo. 80033
Filed Feb. 17, 1965, Ser. No. 433,292
9 Claims. (Cl. 175—19)

ABSTRACT OF THE DISCLOSURE

An earth boring device for compactable soil forces a conical auger by pressure into earth along the center line of the desired hole, displacing soil laterally into the soil around the hole, and tapered compactors or rollers diverging outwardly from a position above the auger enlarges the hole by rolling and compacting additional soil with the soil from the auger into the soil around the hole, forming an enlarged hole having a compacted soil around and extending a substantial distance away from the wall of the hole. The rollers are pivotally mounted and extend outwardly under pressure from the digging shaft in boring position and retract for withdrawal from the hole.

---

This invention relates to earth boring machines, to a process for boring holes using such machines and to the method of setting poles or the like in such holes.

Conventional power-driven augers are rotating members provided with one or more spiral flights and when such rotating augers are pressed into the ground, soil is dug from the earth and is removed from the hole by moving up the spiral flight. A hole is formed as a result of soil removal in the digging process. When the hole is bored to approximately the proper depth the auger is removed. A certain amount of loosened soil falls back into the hole, requiring a cleaning operation. When the hole is cleaned, the pole for which the hole is dug is inserted, and the removed earth or soil is back-filled into the hole around the pole. Particularly for tall poles such as for service lines the earth back-filled must be tamped to provide a firm setting for the pole. Loose soils, wet and sticky soils and in sandy soils and the like do not permit an auger to bore a clean hole since the loosened dirt falls back from the spiral flight into the hole as the auger is retrieved. Additionally, those types of soil do not provide a satisfactory foundation for long term pole support even with adequate tamping. The particular system of pole setting is quite unsatisfactory where the pole setters do not adequately tamp the back-fill, a situation which occurs frequently particularly when work schedules are heavy.

According to the present invention I have provided a boring machine which makes a hole only slightly larger than the pole to be placed in it. The machine bores a hole in the earth by displacement of the soil, i.e. moving the soil laterally from the boring machine into the surrounding earth, compacting the soil a substantial distance from the hole. The side wall is compacted, forming an accurate hole, without the removal of soil. Additionally the compacted side wall is scarified with indentations to provide a secure grip between the side wall and the material which fills the space between the hole and the hole side wall. The boring machine utilizes the rotative forces as well as downwardly directed pressures from conventional hydraulic or mechanical digging apparatus, to force the displaced earth laterally of the boring machine and to compact it into the side wall. The hole is preferably bored to a diameter only slightly larger than the pole to be set in the hole, and after the pole is set in the hole a filler, which hardens on setting, is poured into the annular void between the pole and the wall. When set, the pole is secured firmly in position and is retained in position for long periods due to support from the compacted earth surrounding the pole and the filler which provides a firm anchor for the pole in the earth. Preferably the filler should be water-proof and should be vermin proof to protect the embedded portion of the pole.

A major object of the invention is to provide a method of boring a hole in earth wherein the soil is displaced laterally and compacted into the side wall of the hole, and means are provided for performing the method of boring such a hole.

Another object of the invention is to provide a machine which is arranged to displace dirt laterally, rolling and compacting it into the side wall, thereby boring a hole in the earth with compacted side walls.

Another object of the invention is to provide a boring machine which displaces soil laterally, compacts the same in the side wall and scarifies the side wall to provide a secure bond with filling material placed in the annular opening between a pole and the wall of the hole.

A further object of the invention is to provide a boring tool which includes a penetrating and soil displacing point, a roller compacting mechanism which expands laterally under boring pressure and retracts inwardly for withdrawal of the device from the hole and a scarifier for scarifying the wall of the hole during boring.

Another object of the invention is to provide a method of setting poles in the earth by boring a hole to provide compacted earth around the hole, filling the annular void between a pole placed in the hole and the wall, and permitting the filler material to set and thereby secure the pole in the earth.

These and other objects and advantages of the invention may be readily ascertained by referring to the following description and appended illustrations in which:

FIG. 1 is a side elevational view illustrating the boring machine of the invention;

FIG. 2 is a cross-sectional plan of the device of FIG. 1 taken along section line 2—2;

FIG. 3 is a detail view of a roller element of the boring machine of the invention;

FIG. 4 is a generally schematic view of the boring machine of the invention in boring position;

FIG. 5 is a schematic view of the boring machine in retracted position for withdrawing the same from the hole; and FIG. 6 is a partial cross-sectional view of a hole bored in the earth with a pole set in the hole and filler material filling the void between the hole wall and the pole.

In the device which is selected for illustration only, the boring machine includes a pilot auger, shown in general by numeral 1, which is a generally cone-shaped member having a series of curved flutes 2, terminating in a penetrating point 3. The auger has six such flutes and each flute is spiraled and is hollowed on the digging side to force the soil outwardly as the pilot auger rotates and is pressed downwardly. A plate 7 is welded or otherwise affixed to the top 4, i.e. the base of the conical pilot auger. The base 7 is provided with a plurality of radially elongated bores 8, FIG. 2, which are spaced about 90° apart and radially outwardly from the center of the base 7. A support shaft 10 is welded or otherwise centrally affixed to the plate 7 by one end and to a top plate 11 at the upper end thereof. The plate 11 has four ears 12 which extend outwardly and then downwardly from the central portion of the plate 11. Four compacting rollers, shown in general by the numeral 15, are mounted between the plate 7 and the upper plate 11. The compacters are mounted on shafts which are secured between the two plates and biased generally outwardly. The shafts are movable to different angular positions, as explained below. The compacting rollers, one of which is shown in FIG. 3, include a top section 16 having extending scarifiers 17 at 90° opposed positions around the generally circular top. The lower portion of the roller includes a series of fluted faces 18 which extend from the top toward the bottom and fluted faces 14 which extend from the bottom toward the top, each of the fluted faces being generally a triangular plane which is biased to its neighboring plane thereby providing a roller with a discontinuous surface. Each roller is mounted on a shaft 19 which is pinned by means of pins 20 to the pilot auger through an enlarged bore 22 in the plate 7 which permits the shaft 19 to pass through the plate and move from its retracted to its extended position. Each shaft 19 at its upper end passes through an elongated hole 23 in the ear 12 to permit the shaft to move from outer extended to inner retracted position. Suitable bearings, not shown, are provided to rotate the roller to permit it to rotate freely on the shaft 19. The bearings may be fully enclosed and self-lubricating where desired.

The top of the shaft 19 is pivotally secured to a toggle link 30 by means of pivot pin 31, and the toggle link 30 is pinned to an ear 32 depending outwardly from a collar 33. Each toggle link 30 is secured to the ear 32 by means of a pin 34. The collar 33 is telescoped over tubular extension 35 which is secured to the plate 11. The collar 33 is freely slidable on the extension 35, and is prevented from moving completely up the extension 35 by means of a series of bolts 37 which extend from the collar 33 into slots 38 and threadedly connect with a digger shaft 39. The digger shaft is connected to a conventional boring machine (not shown) which is arranged to press on the shaft and rotate the same for digging action. Since the digger shaft is connected to the collar 33, downward pressure will force the toggle link to its outermost position, as shown in FIGS. 1 and 4. An upward pressure or retrieving pressure will pull the toggle link to its retracted or innermost position as indicated by dashed lines in FIG. 1 and in FIG. 5, with the rollers in the innermost position.

The boring device of the invention is utilized by attaching it to a digging apparatus, which is arranged to press downwardly and to rotate the boring device. As shown in FIG. 4, the boring machine is in digging position. Pressure applied on the digging shaft 39 forces the auger downwardly into the earth, and rotation of the shaft rotates the hole boring machine so that the pilot auger digs a hole and forces the dirt sideways from the auger. The biased rollers progressively force the dirt laterally, rolling and compacting it into the side wall 50, the scarifiers 17 leaving a plurality of segments of grooves 51 in the side wall. Since the scarifiers are points on the rollers, the grooves ar discontinuous and a series of such indentations or grooves are formed in the side wall. It is noted that pressure on the shaft 39 forces the collar 33 downwardly, the links 30 outwardly, and thereby the rollers are forced outwardly so that the outermost edge of the biased roller forms the wall of the bore. As shown in FIG. 6, the starting of the bore actually forms a slight mound 52 above the earth's surface due to the compaction; however, as the boring machine penetrates the earth the compaction forces the dirt into the side wall, compacting the side wall a substantial distance from the bore. The compaction of the dirt outwardly from the bore provides a firm base completely around the hole. The distance of compaction from the bore is normally determined by the density and the quality of the soil, etc. Since the rollers are freely rotating on their shafts, rotation of the machine causes the rollers to rotate due to the friction of the rollers with the wall, and the rolling and the pressure forces the dirt outwardly into the side wall. The boring is continued until the depth of the hole reaches the desired measurement. Since no earth is removed but is compacted into the side wall, removal of the boring machine produces a hole which is an exact size and an exact shape. When the depth of the bore desired is reached, an upward pressure on the shaft 39 pulls the collar 33 upwardly, along with the links 30, to move the compacting rollers inwardly away from the wall. The machine may then be retrieved from the hole without touching the side wall. Thus, it is seen that any digging movement of the shaft 39 affects the positioning of the compacting rollers. The extent to which the rollers will move outwardly may be predetermined by limiting the depth to which the digger shaft can go into the extension 35, which in turn controls the outward movement of the linkages and the outward movement of the rollers. A control of the size of bore hole is thereby easily provided. Also, outward movement may be limited by set screws in ears 12 bearing against shafts 19. The pressure from the digging shaft is transmitted through the top plate to the auger by means of a center shaft 10 and the torque is also carried by the center shaft to the pilot shaft.

After the boring machine has been withdrawn from the hole, a pole 55, shown in FIG. 6, is placed into the hole to where it rests on the bottom conical shaped section 56 of the hole. Plastic or other filling material 57 is then poured into the annular void between the pole and the side wall of the shaft. Preferably, this filling material is waterproof, to thereby completely waterproof the bottom of the pole, vermin proof, etc. Such materials as synthetic resins, various types of potting materials, asphalt, bituminous material and the like may be used. In some instances, fast-setting concrete may be used. Bituminous material may be used which provides a means for waterproofing the bottom of the pole and making it vermin proof. When set, the filling material provides a firm foundation which, due to the small scarifications 51, provides a firm anchor for the pole in the compacted earth. Additionally, various types of material, including bituminous material, adhere quite strongly to the bottom of the pole, increasing the anchoring of the pole in the ground.

Where electrical insulation is necessary or desirable for the pole, a dielectric compound may be poured into the annular space and after setting provides an insulated setting for the pole. It is to be noted that the size of the hole is made to conform to the particular pole, reducing the amount of filler necessary to set the pole. Additionally, since no earth is removed from the hole, small rocks and the like are pushed and compacted into the side wall, forming a still more densified or compacted side wall. Larger rocks which are normally removed in conventional digging processes are merely moved aside by the digging apparatus, thereby reducing the labor of producing bores for the poles or posts.

While the invention has been illustrated by specific embodiments, there is no intent to limit the spirit or the scope of the invention to precise details so set forth except as defined in the following claims.

I claim:

1. A device for boring holes in compactable earth comprising a conically shaped auger having a base portion of a diameter less than the hole being bored, said auger including a point for penetrating earth and means to move earth outwardly on rotation; a stub shaft depending from said base portion of said auger; a supporting member mounted on the other end of said stub shaft; a plurality of freely rotatable, truncated conical rollers each with a non-cutting surface mounted between said base portion and said supporting member, said rollers being biased outwardly at the top and each top being movable inwardly and outwardly for a limited distance so as to progressively laterally move and compact soil into the wall of the hole generally from the bottom to the top of the roller; and a digging shaft depending beyond said supporting member, whereby said auger may be rotated and pressed into the earth to form a hole by moving and compacting soil into the wall of said hole and pressure on said digging shaft moves said rollers outwardly from the top to compact soil into the wall, thereby enlarging the hole.

2. A device for boring holes in compactable earth comprising an auger having a base portion and a point and having means to move soil radially outwardly on rotation thereof; a stub shaft depending axially from said auger opposite said point; a supporting member mounted on the other end of said stub shaft; a plurality of freely rotatable, truncated conical rollers, each with a non-cutting surface comprising a series of triangular planes mounted between said base portion and said supporting member, said rollers being biased outwardly at the top and said top being movable inwardly and outwardly for a limited distance so as to progressively move and compact soil into the wall of the hole generally from the bottom to the top of the roller; and a digging shaft depending beyond said supporting member, whereby said auger may be rotated and pressed into the earth to form a hole by moving and compacting soil into the wall of said hole and pressure on said digging shaft moves said rollers outwardly from the top to compact soil into the wall and form an enlarged hole.

3. A device for boring a hole in the earth comprising a conical auger, said auger including a plurality of spiraled flutes arranged to displace soil outwardly; a stub shaft depending normally from the base of said auger; a plate with outwardly depending ears mounted on the opposite end of said stub shaft, there being an elongated slot through each said ear; a plurality of shafts pivotally affixed in said base and extending through said slots; a truncated conical roller mounted for rotation on each said plurality of shafts and each with its major base adjacent said plate; a collar reciprocally disposed above said plate; a digging shaft secured to said collar and extending therebeyond; means connecting the end of each said shaft and said collar whereby downward pressure on said collar moves said plurality of shafts outwardly and upward pressure on said shaft moves said plurality of shafts inwardly; and means arranged to limit the inward and outward movement of said plurality of shafts.

4. A device for boring a hole in the earth comprising a conical auger, said auger including a plurality of spiraled flutes arranged to displace soil outwardly; a stub shaft depending normally from the base of said auger; a plate with outwardly depending ears mounted on the opposite end of said stub shaft, there being an elongated slot through each said ear; a plurality of shafts pivotally affixed in said base and extending through said slots; a truncated conical roller mounted for rotation on each said plurality of shafts and each with its major base adjacent said plate; a collar reciprocally disposed above said plate; a digging shaft secured to said collar and extending therebeyond; pivoted link means secured between the end of each said shaft and said collar whereby downward pressure on said collar moves said plurality of shafts outwardly and upward pressure on said shaft moves said plurality of shafts inwardly; and means arranged to limit the inward and outward movement of said plurality of shafts.

5. A device for boring a hole in the earth comprising a conical auger, said auger including a plurality of spiraled flutes arranged to displace soil outwardly; a stub shaft depending normally from the base of said auger; a plate with outwardly depending ears mounted on the opposite end of said stub shaft, there being an elongated slot through each said ear; a plurality of shafts radially pivotally affixed in said base and extending through said slots; a truncated conical roller mounted for rotation on each said plurality of shafts and each with its major base adjacent said plate and each roller having an irregular and discontinuous surface; a collar reciprocably disposed above said plate for limited movement; a digging shaft secured to said collar and extending therebeyond; pivoted link means secured between the end of each said shaft and said collar whereby downward pressure on said collar moves said plurality of shafts outwardly and upward pressure on said shaft moves said plurality of shafts inwardly; and means arranged to limit the inward and outward movement of said plurality of shafts.

6. A device according to claim 5 in which each roller includes scarifying means to at least partially groove the hole being bored.

7. A device according to claim 5 in which each said roller includes four opposed scarifying points adjacent the major base of said roller.

8. A method of boring a hole in compactable earth without removing earth from the hole comprising forcing a small hole in the earth by displacing the earth from said small hole laterally of the center line of the hole; and rolling and compacting the displaced earth with additional earth into the wall of the hole to form a larger hole with the earth surrounding the hole being compacted a substantial distance beyond the wall surface of the hole.

9. A method of boring a hole in compactable earth without removing earth from the hole comprising forcing a small hole in the earth by progressively displacing earth from the hole from the hole bottom upwardly and outwardly and progressively compacting the displaced earth with additional earth into the wall of the hole to form a larger hole with the earth surrounding the hole being compacted a substantial distance beyond the hole.

References Cited
UNITED STATES PATENTS

| | | | |
|---|---|---|---|
| 1,577,810 | 3/1926 | Reymond | 175—335 |
| 1,862,629 | 6/1932 | Morrison | 175—285 X |
| 2,110,582 | 3/1938 | Smith | 175—335 |
| 2,169,502 | 8/1939 | Santiago | 175—335 X |
| 2,227,763 | 1/1941 | Santiago | 175—285 X |
| 2,229,912 | 1/1941 | Baily | 175—21 X |
| 2,499,630 | 3/1950 | Clark | 175—335 X |
| 2,528,300 | 10/1950 | Degner | 175—334 X |
| 2,951,681 | 9/1960 | Degen | 175—21 |
| 3,145,783 | 8/1964 | Sibley | 175—19 |

CHARLES E. O'CONNELL, *Primary Examiner.*

R. E. FAVREAU, *Assistant Examiner.*